United States Patent [19]

Gubin

[11] Patent Number: 5,895,011
[45] Date of Patent: Apr. 20, 1999

[54] TURBINE AIRFOIL LIFTING DEVICE

[76] Inventor: Daniel Gubin, P.O. Box 10, Coosada, Ala. 36020

[21] Appl. No.: 08/880,304

[22] Filed: Jun. 24, 1997

[51] Int. Cl.$^6$ .................................................. B64C 29/00
[52] U.S. Cl. .................... 244/12.1; 244/12.3; 244/23 R; 244/23 B; 244/23 C
[58] Field of Search .................. 244/12.1, 12.2, 244/12.3, 12.4, 12.5, 23 R, 23 B, 23 C, 23 D; 416/171; 417/406, 407

[56] References Cited

U.S. PATENT DOCUMENTS

| | | | |
|---|---|---|---|
| 2,863,621 | 12/1958 | Davis | 244/23 C |
| 3,045,949 | 7/1962 | Stahmer | 244/12.3 |
| 3,056,565 | 10/1962 | Griffith | 244/12.3 |
| 3,082,977 | 3/1963 | Arlin | 244/12.2 |
| 3,154,917 | 11/1964 | Williamson | 244/23 B |
| 3,170,285 | 2/1965 | Ferri | 244/23 B |
| 3,179,353 | 4/1965 | Peterson | 244/12.3 |
| 3,514,053 | 5/1970 | McGuinness | 244/23 C |
| 3,933,325 | 1/1976 | Kaelin | 244/23 C |
| 5,149,012 | 9/1992 | Valverde | 244/23 C |

*Primary Examiner*—Galen L. Barefoot

[57] ABSTRACT

A turbine airfoil unit is described which enables an aircraft to ascend and descend vertically. Multiple turbine airfoil units may be arranged within a large disk-like structure and thereby overcome size limitations placed on helicopters by their rotors. One or more central engines providing a flow of air under pressure relative to ambient air supplies power to one or multiple turbine airfoil units. The pressurized air from the engines is funneled into the containing disk-like structure and distributed to all turbine airfoil units encompassed therein. The supplied air acts on the turbines to rotate the airfoils and thus create lift. The lift is transmitted to the disk-like structure and to the remainder of the aircraft by bearings between the turbine airfoil unit and the containing portion of the disk-like structure. The large disk-like structure is known in the popular culture as a flying saucer.

5 Claims, 7 Drawing Sheets

TURBINE AIRFOIL LIFTING DEVICE

BRIEF SUMMARY OF THE INVENTION

The description refers to a device that provides lift for vertical flight. Unique features provide for the utilization of multiple units in a single aircraft thereby allowing very large aircraft to takeoff, fly, and land vertically as well as to fly horizontally. The power supplied by the engines energize the air directly as in a turbojet, or operate propellers or fans which energize the air that passes within their zone of action. The air thus energized is directed into a large disk-like structure and is distributed to each of the turbine airfoil lifting units contained within said disk-like structure. No shafting or gearing is required between the central engine or engines and the lifting airfoils. No shafting is required to support the turbine-rotor assemblies as they rotate within the stator portions of the invention. The energized air is passed through a circumferential turbine in each unit which rotates the lifting airfoils. The lift is transmitted to the large disk-like structure which contains the energized air and lifting units by means of bearings placed between the turbine airfoil units and the surrounding parts of the large disk-like structure. The features include:

(1) Airfoils that rotate in ambient air to provide lift.

(2) A turbine surrounding the airfoils which when rotated, causes the airfoils to rotates.

(3) A supply of energized air distributed to the turbine causing it to rotate.

(4) A disk-like structure that contains both the energized air to be distributed and the turbine airfoil units.

(5) A bearing mechanism between the rotating turbine airfoil units and the surrounding structure.

Also described is the aircraft that results from utilizing multiple turbine airfoil lifting devices. The features of such an aircraft include:

(6) An engine or engines that supply energized air.

(7) A cowling to direct the energized air to a disk-like structure.

(8) A disk-like structure and plenum chamber to contain and distribute the energized air.

(9) Multiple turbine airfoil lifting devices to provide lift to the aircraft.

(10) A rear facing adjustable opening in the cowling and or disk to provide for the exhausting of energized air rearward for forward flight.

(11) Adjustable openings in the cowl, disk, or plenum which provides for control of the aircraft by the discharge of energized air.

(12) Adjustable means between the energized air in the disk-like structure and the turbines of the turbine airfoil lifting devices or within the devices themselves providing for the diminishment of air to the turbines thereby decreasing the lift of one or more turbine airfoil lifting devices thereby achieving pitch and roll control.

BACKGROUND OF THE INVENTION

When an airfoil of appropriate design is moved through air, lift is provided to the airfoil and thereby to any structure attached thereto. In an airplane, the wings as well as other parts are such airfoils. The forward motion of the airplane provides the relative motion between airfoils and surrounding air. In a helicopter, the rotor blades are the airfoils that provide the lift. The helicopter engine turns a shaft which rotates the rotor blades providing lift. In the present invention the airfoils which provide lift are contained in a cylinder which rotates, thereby causing the airfoils to rotate. The cylinder is made to rotate by the passage of air through that portion of the cylinder which constitutes a circumferential turbine. The energized air is supplied by a piston engine turning a propeller, or a turboprop engine, or a turbofan engine, or a turbojet engine. The energized air so supplied is funneled by means of a cowling into a disk-like structure which distributes the energized air so supplied to each turbine of the turbine airfoil devices described. Vertical takeoff, flight, and landing is thus possible. The size of a helicopter is limited by the strength of the rotor shaft structures against centrifugal forces and by the velocity of the rotor tip relative to the speed of sound. Some helicopters have two rotors, but practical limits to increasing the size of vertical takeoff and landing craft utilizing current technology have been reached. Also the differential lift of helicopter blades relative to the air when the helicopter is in forward flight limits the speed of helicopters. The present invention overcomes these limitations by providing for multiple units to be assembled in a large air distributing disk. One or two central engines may provide the energized air needed for all the turbines in all the turbine airfoil units utilized. No shafting or gearing is required to translate the power of the central engines to each of the turbine airfoil units that provide lift. The increased weight required by the disk-like structure and turbines compared to rotors turned by a central shaft as in a helicopter is offset by the increased forward speed capabilities and by the ability of the invention to be scaled up to very large aircraft. The invention thereby makes real a branch of powered flight that has previously been only fanciful, the flying saucers.

DETAILED DESCRIPTION

Figure 1:
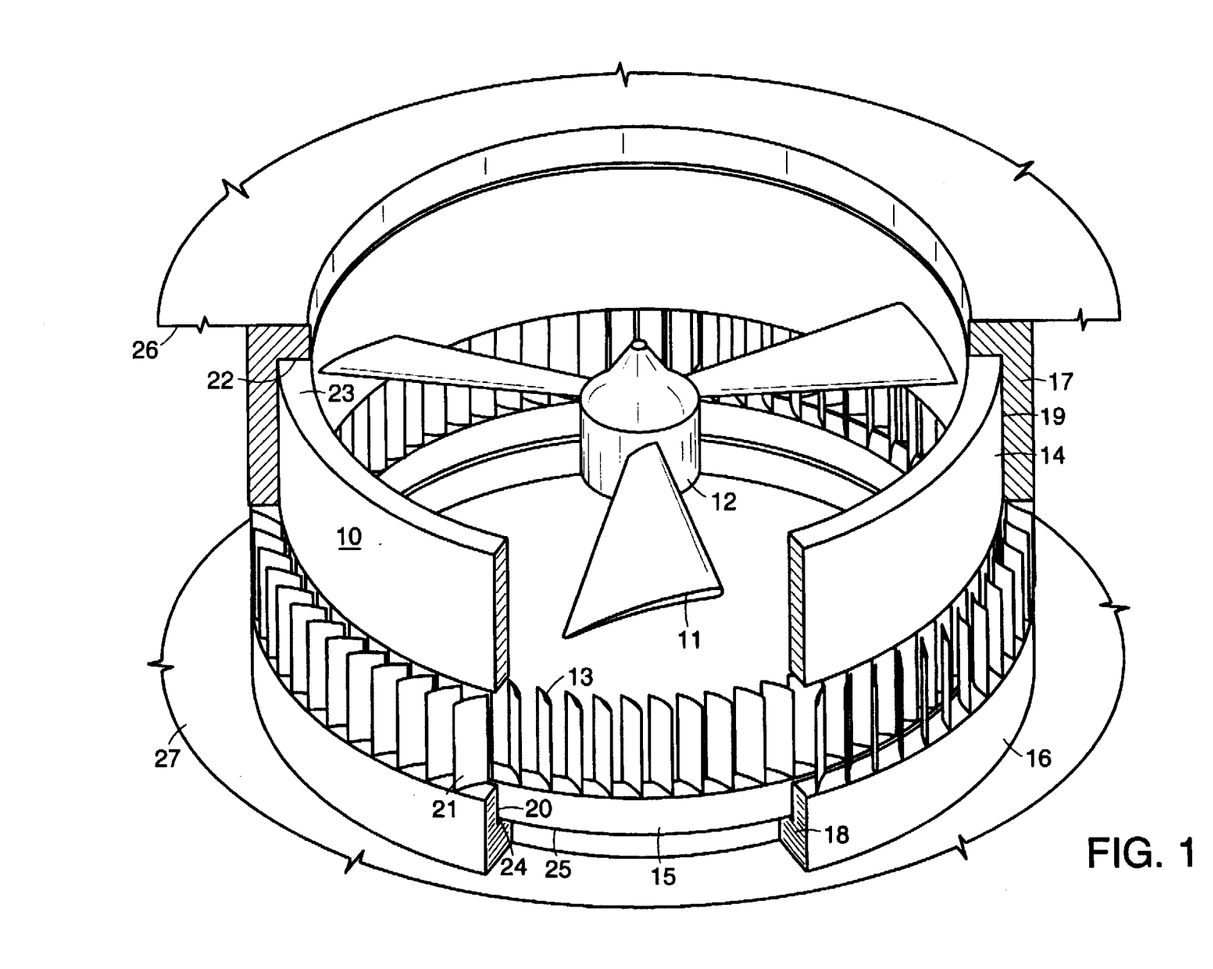
FIG. 1 represents a partial cutaway view of a turbine airfoil lifting device.

FIG. 1 shows the turbine airfoil lifting device. The rotating cylinder 10 is partially cut away in this view to more clearly demonstrate airfoils 11 which are attached at their outer edges to cylinder 10. The airfoils 11 may attach centrally to a hub unit 12. A portion of rotating cylinder 10 includes turbine blades 13 which are positioned and shaped to rotate cylinder 10 about a central vertical axis when acted upon by air moving from a source of greater pressure from outside the cylinder 10 centrally towards ambient air that surrounds the airfoils 11 centrally within the rotating cylinder 10. The rotating cylinder 10 includes outer circumferential surfaces 14 and 15 that are in close proximity to the surrounding stator cylinder 16 shown cut away at 17 and 18. The stator cylinder 16 contains surfaces 19 and 20 that are in proximity to surfaces 14 and 15 respectively of rotating cylinder 10. Stator cylinder 16 also contains stator blades 21 that direct energized air from outside the stator cylinder 16 towards the turbine blades 13 of rotating cylinder 10 so as to increase the action of the air on the turbine blades 13 of rotating cylinder 10. Stator cylinder 16 contains bearing aspect 22 that extends inwardly overhanging a bearing aspect 23 of rotating cylinder 10. Stator cylinder 16 contains bearing aspect 24 that extends inwardly underhanging bearing aspect 25 of rotating cylinder 10. Stator cylinder 16 is attached to top containing surface 26 and bottom containing surface 27. Containing surfaces 26 and 27 receive air under pressure and contain such air within their confines, discharging such air through stator blades 21 and thence through turbine blades 13 causing rotating cylinder 10 to rotate. The rotation of rotating cylinder 10 causes the airfoils 11 to rotate. The rotation of airfoils 11 within ambient air causes lifting forces to be exerted upon airfoils 11. The lifting forces are transmitted to cylinder 10 by the attachment of airfoils 11 to rotating cylinder 10. The lifting forces transmitted to cylinder 10 by the rotation of airfoils 11 is further transmitted through roller bearings placed between the upper bearing aspect 23 of the rotating cylinder 10 and the overhanging bearing aspect 22 of stator cylinder 16. The lifting forces are thence transmitted through the stator cylinder 16 to the remainder of the aircraft to which it is attached. When the rotating cylinder 10 is not acted upon by air passing through turbine blades 13, the weight of the rotating cylinder 10 is transmitted through lower bearing aspect 25 of the rotating cylinder 10 through roller bearings to underhanging bearing aspect 24 of stator cylinder 16. The distance between the overhanging portion of stator cylinder 16 at 22 and the underhanging portion of stator cylinder 16 at 24 less the width of the two sets of intervening bearings may beneficially be slightly greater than the distance between the top surface 23 of rotating cylinder 10 and the bottom surface 25 of rotating cylinder 10. When the lift imparted by the airfoils 11 exceeds the weight of the rotating cylinder 10, the roller bearings between the top bearing aspect 23 of rotating cylinder 10 and the overhanging bearing aspect 22 of stator cylinder 16 are engaged and transmit the lift to stator cylinder 16. When the amount of lift, if any, imparted by the airfoils is less than the weight of the rotating cylinder 10, the roller bearings between the lower bearing aspect 25 of rotating cylinder 10 and the underhanging bearing aspect 24 of stator cylinder 16 transmit the weight of the rotating cylinder 10 to the stator cylinder 16.

Figure 2:
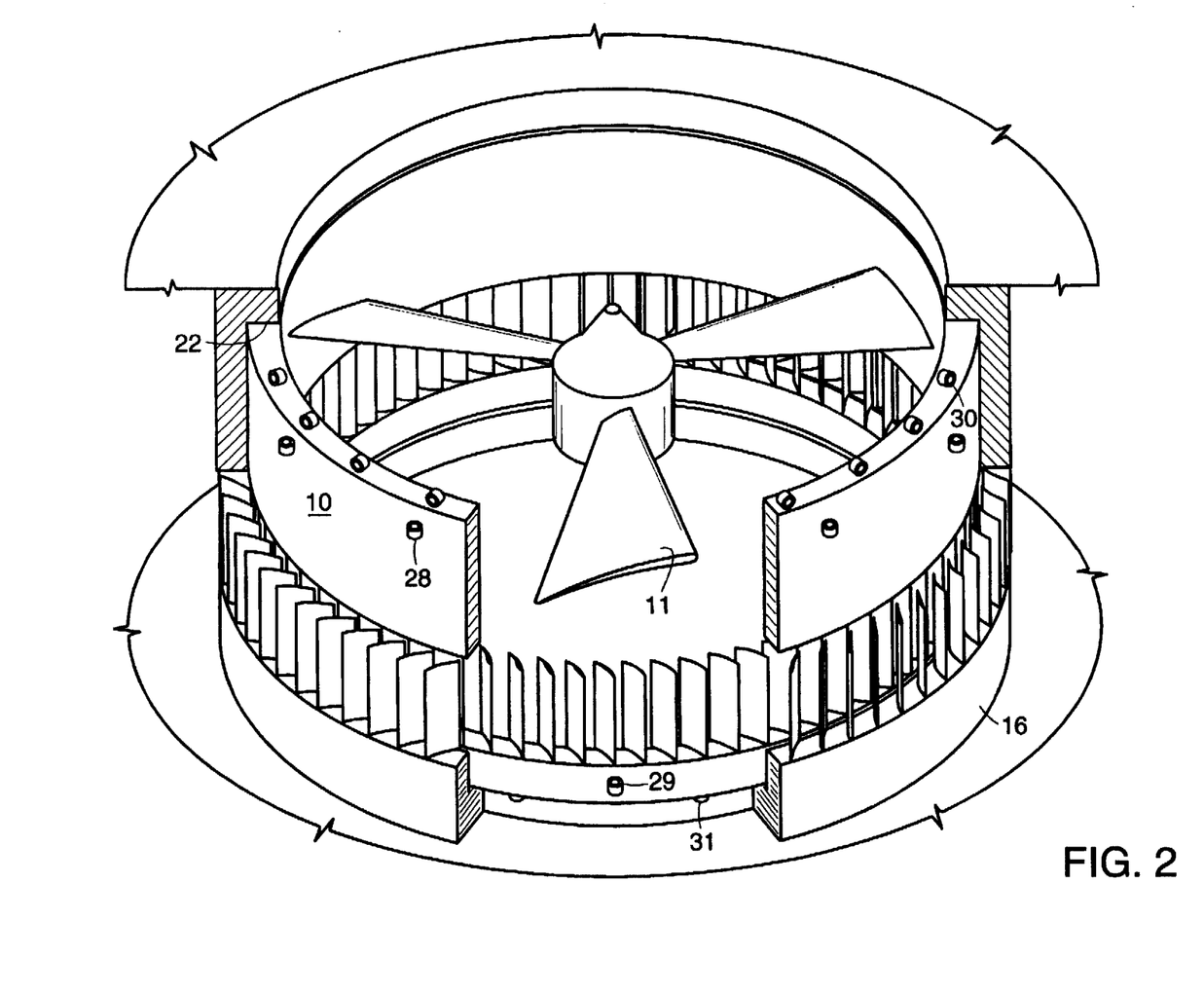
FIG. 2 shows placement and orientation of roller bearings to support the rotating cylinder, permit rotation, and transmit lifting forces from the rotating cylinder to the remainder of the aircraft

FIG. 2 indicates how bearings may be placed so that the rotating cylinder 10 may rotate within stator cylinder 16. The partial removal of stator cylinder 16 reveals roller bearings 28 and 29 placed circumferentially within the inner circumference of stator cylinder 16 extending to interface with the outer circumferential surface of rotating cylinder 10. The bearings may be attached to either rotating cylinder 10 or stator cylinder 16. Bearings 30 placed beneath the overhanging aspect of stator cylinder 16 attached either to stator cylinder 16 or to rotating cylinder 10 transmit the lifting forces generated by the airfoils 11 to the stator cylinder 16. Bearings at 31, partially hidden in this view by rotating cylinder 10 transmit the weight of the rotating cylinder 10 to the stator cylinder 16 when the weight of the cylinder is not offset by the lift provided by the airfoils.

Figure 3:
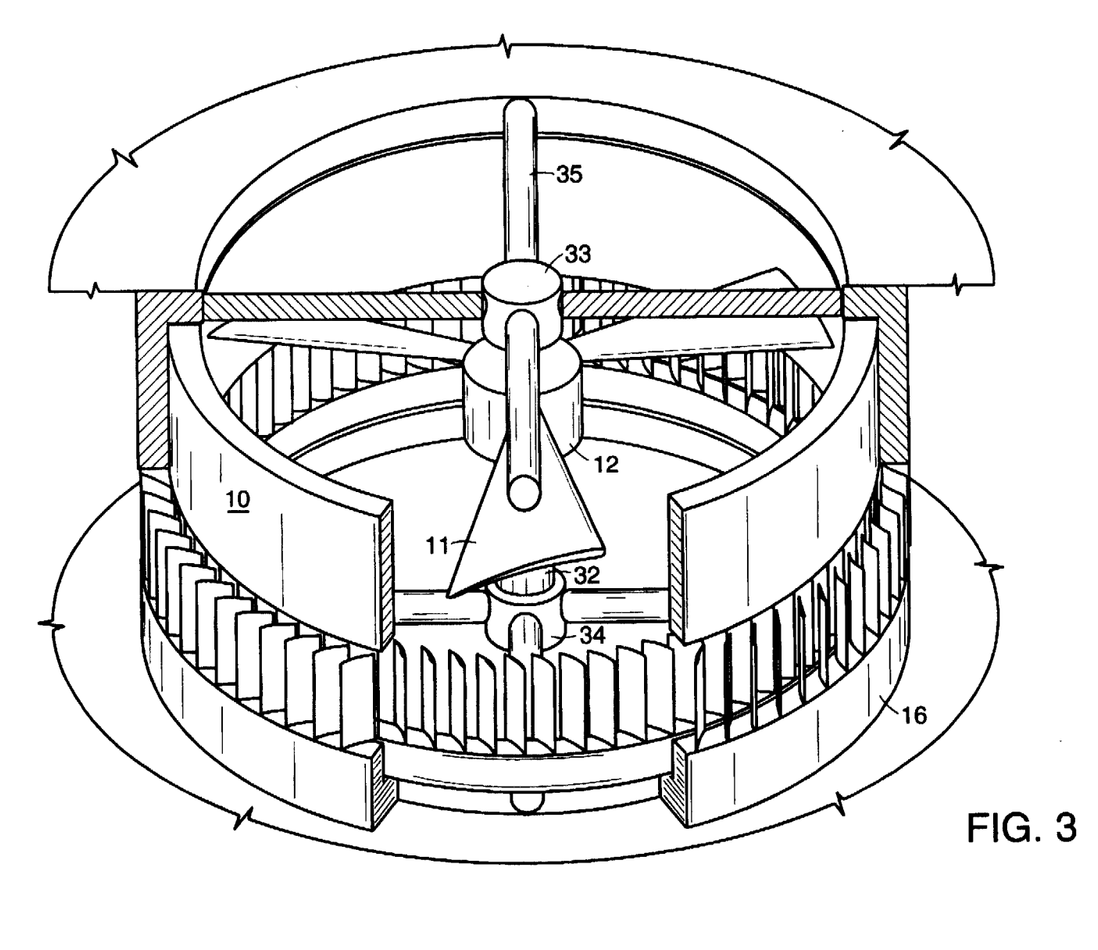
FIG. 3 shows a turbine airfoil lifting device that utilizes a central shaft and shaft bearings for the transmission of forces.

FIG. 3 shows a bearing arrangement utilizing a central shaft 32 of rotating cylinder 10. The shaft is supported by upper bearing body 33 and lower bearing body 34, which are in turn supported from the stator cylinder 16 by spokes 35. The bearing bodies 33 and 34 contain radial thrust bearings to provide for rotation and the transmittal of lifting forces and weight. The shaft 32 is fixed to hub 12 which is attached to airfoils 11 which attaches to rotating cylinder 10.

Figure 4:
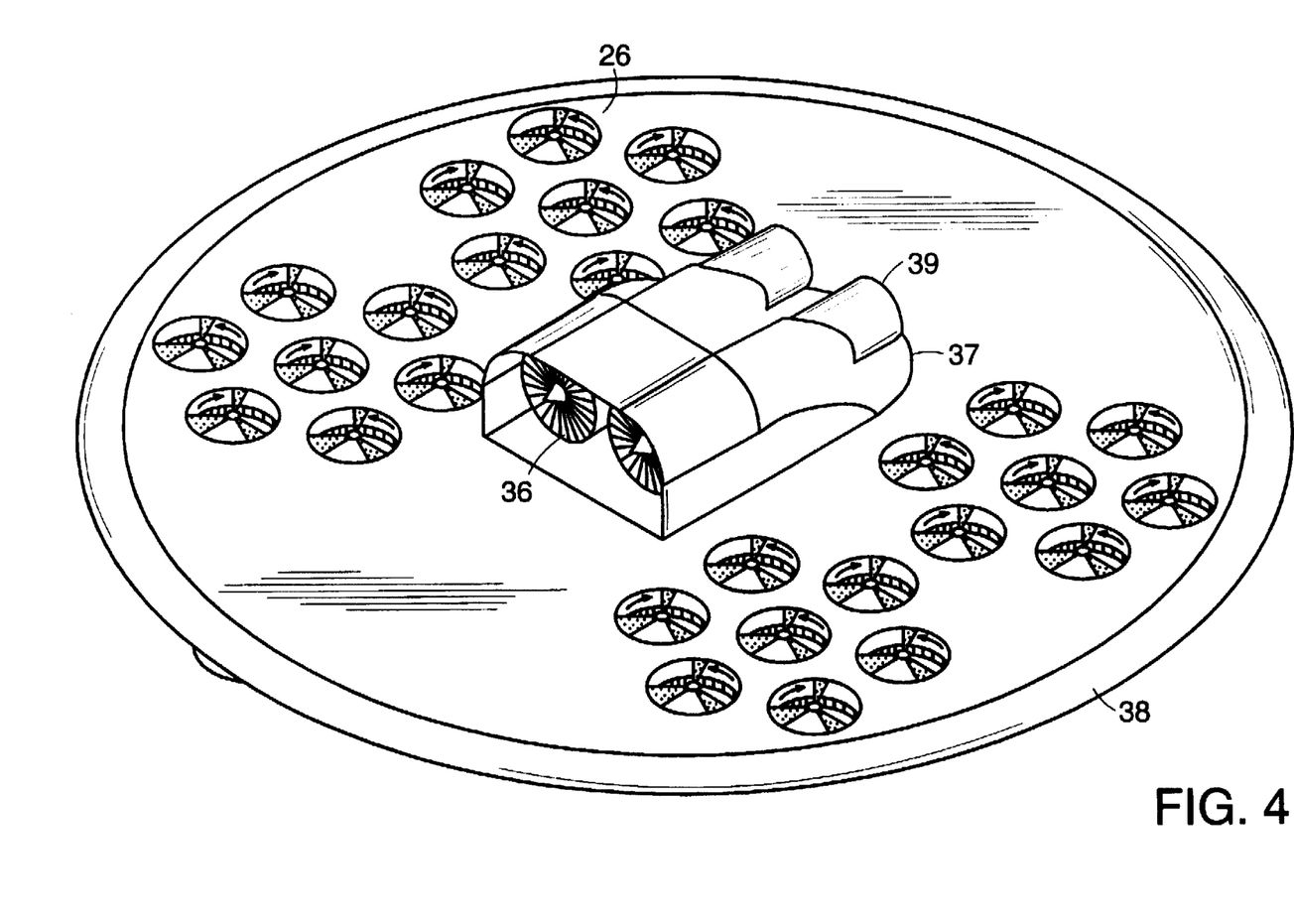
FIG. 4 shows an aircraft that utilizes multiple disk lifting devices.

FIG. 4 shows an aircraft from above the port side that contains twenty-eight separate turbine airfoil lifting devices, disk lifting bodies, within its structure. Central motors 36 provide energized air which is directed by cowling 37 into disk-like structure 38 of which the upper outer surface 26 is in continuity with the stator cylinders of the invention. Alternate disk lifting bodies, the turbine airfoil lifting devices of the invention, may beneficially alternate direction of rotation one relative to another so as to balance total angular momentum of the totality of the devices utilized. Cowling 37 contains exhaust ports 39 that may be opened so as to permit energized air to exit rearward driving the craft forward.

Figure 5:
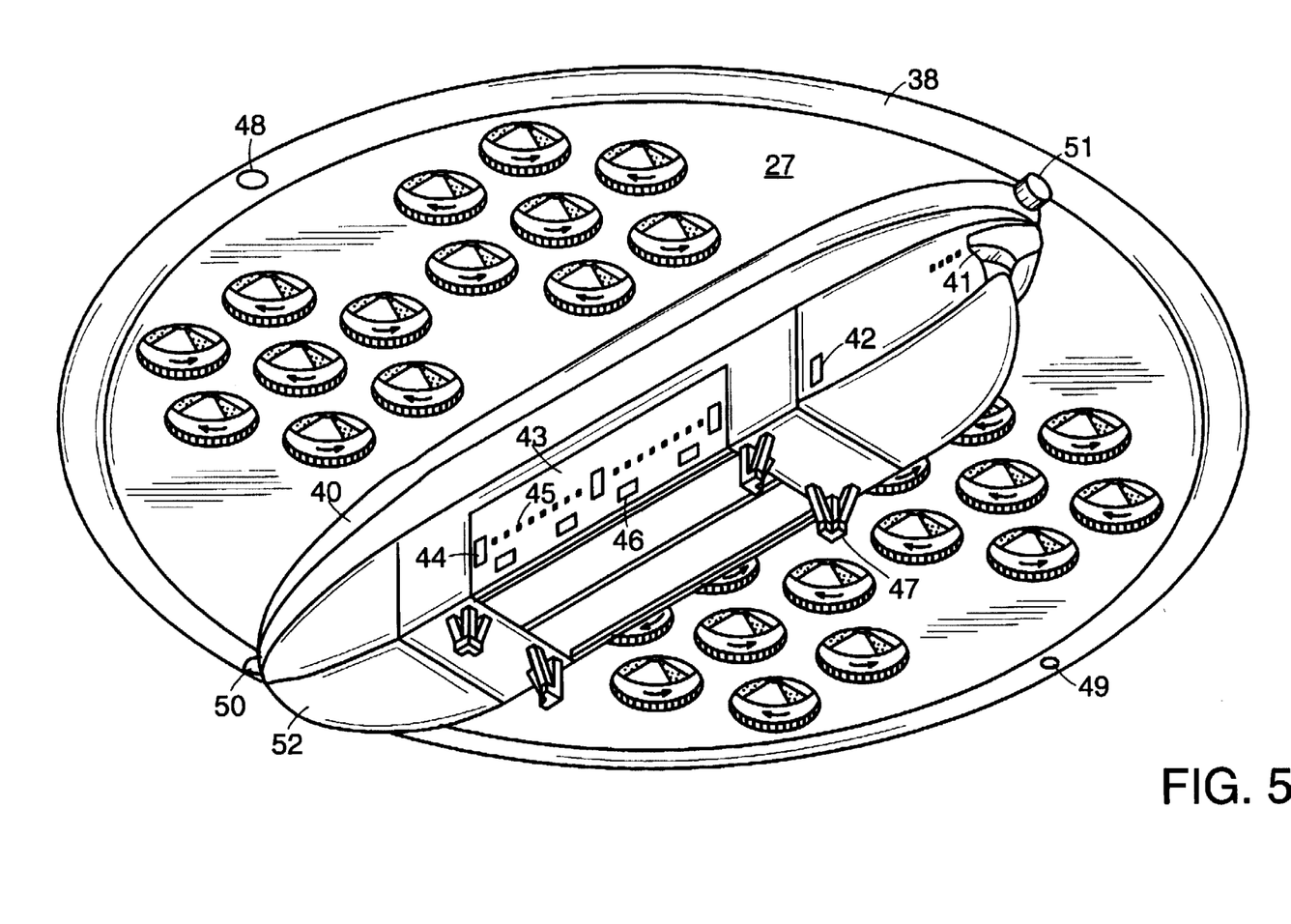
FIG. 5 shows such an aircraft from beneath.

FIG. 5 shows the same aircraft from below from the starboard side. The lower surface 27 of the aircraft disk 38 is visible in this view. A longitudinal plenum chamber 40 open internally to the air containment of disk 38 aids the distribution of the energized air from the engines to the disk lifting bodies. A deeper disk 38 alternatively would aid the distribution of the energized air compared to a thin disk. Such a deeper disk 38 would increase air resistance to forward travel more than its longitudinal deepening provided by plenum chamber 40 would. Also visible in this view are the forward cockpit window 41 and the crew entrance door 42. Passenger compartment 43 containing passenger doors 44, windows 45 and luggage compartment doors 46 are visible in this view. Landing struts 47 provide for support to the craft when on the ground. When in flight the entire craft may be rotated about the central vertical axis by opening tangential exhaust ports 48 or 49. Opening tangential exhaust port 48 on the starboard edge allowing the energized air within disk 38 to exhaust in a rearward direction causes a rotation to port. Opening tangential exhaust port 49 on the port edge has the opposite effect. Exhaust port 50 permitting the rearward exhausting of energized air contained within disk 38 in line with the longitudinal axis of the craft causes forward motion. Rearward motion of the aircraft is provided by port 51 at the front of the craft permitting the exhaustion of energized air towards the front. Rear section 52 may beneficially contain a plenum chamber in continuity with the energized air chambers of longitudinal plenum chamber 40 and the disk 38. Such a plenum chamber may beneficially be provided with heat resistant material when engine combustion products are to be part of the energized air utilized to operate the turbine airfoil devices. The combusted fuel-air products may be cooled by admixing the hot gasses with bypass air within this chamber prior to complete admixture for operation of the turbine airfoil lifting devices. Use of heat resistant materials is thereby minimized.

Figure 6:
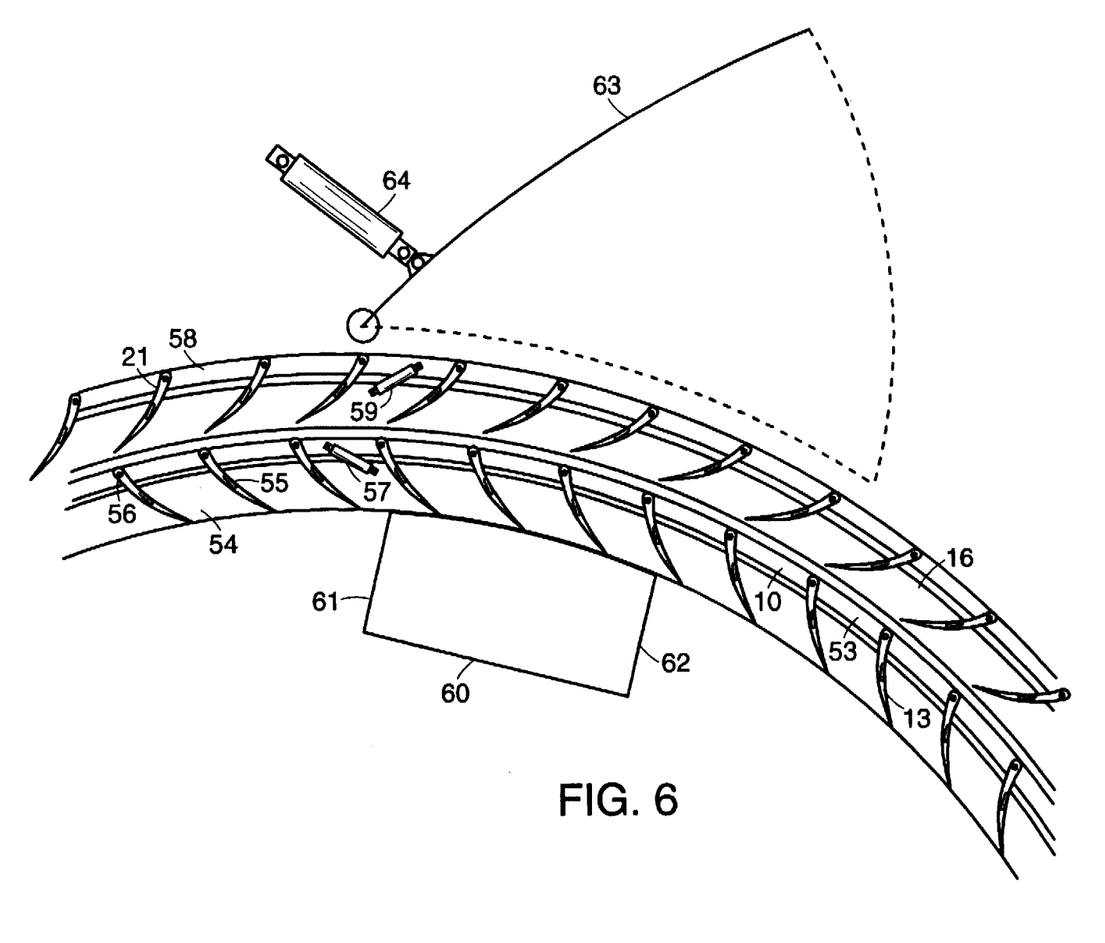
FIG. 6 shows adjustable stator and turbine mechanisms for the control of airflow through the turbines thereby controlling lift.

FIG. 6 shows a portion of the turbine blades 13 and the stator blades 21 with additional features for adjusting air flow through the turbine airfoil lifting devices thereby adjusting lift provided. The outer turbine ring 53 of rotating cylinder 10 rotates relative to stator ring 16 as provided by bearings as previously described. Within outer turbine ring 53, inner turbine ring 54 is pinned in its position relative to turbine ring 53 by pins passing through slots 55 in the turbine blades 13, blade pivots 56, and by actuators 57. External to stator ring 16, external stator ring 58 is similarly held in position relative to stator ring 16 by slotted stator blades 21 and actuators 59. Iris-like closure of the turbine blades 13 and stator blades 21 may thus be achieved by activating actuators 57 and 59 respectively. Power to activate actuators 57 on the turbine ring 53 may be obtained by auxiliary power units that are positioned within the inner turbine ring 54 as shown at 60 so as to receive air-in-motion through a front opening 61 when the turbine is in motion and to discharge the air-in-motion through a rear opening 62 after some energy has been extracted through the turning of turbine generator units or turbine pump units as within the current art of auxiliary power units. The auxiliary power unit positions indicated at 60 are beneficially placed above or below the plane of the turbine blades 13 so as not to interfere with the discharge of air through the turbine blades. Doors 63 may beneficially be placed so as to alternately block or unblock the flow of air through stator blades 21 thereby lowering the lift forces generated by the turbine airfoil lifting devices or in the alternative as drawn in this view, allowing full lifting forces to be achieved. Actuators 64 provide for opening and closing of the doors.

Figure 7:
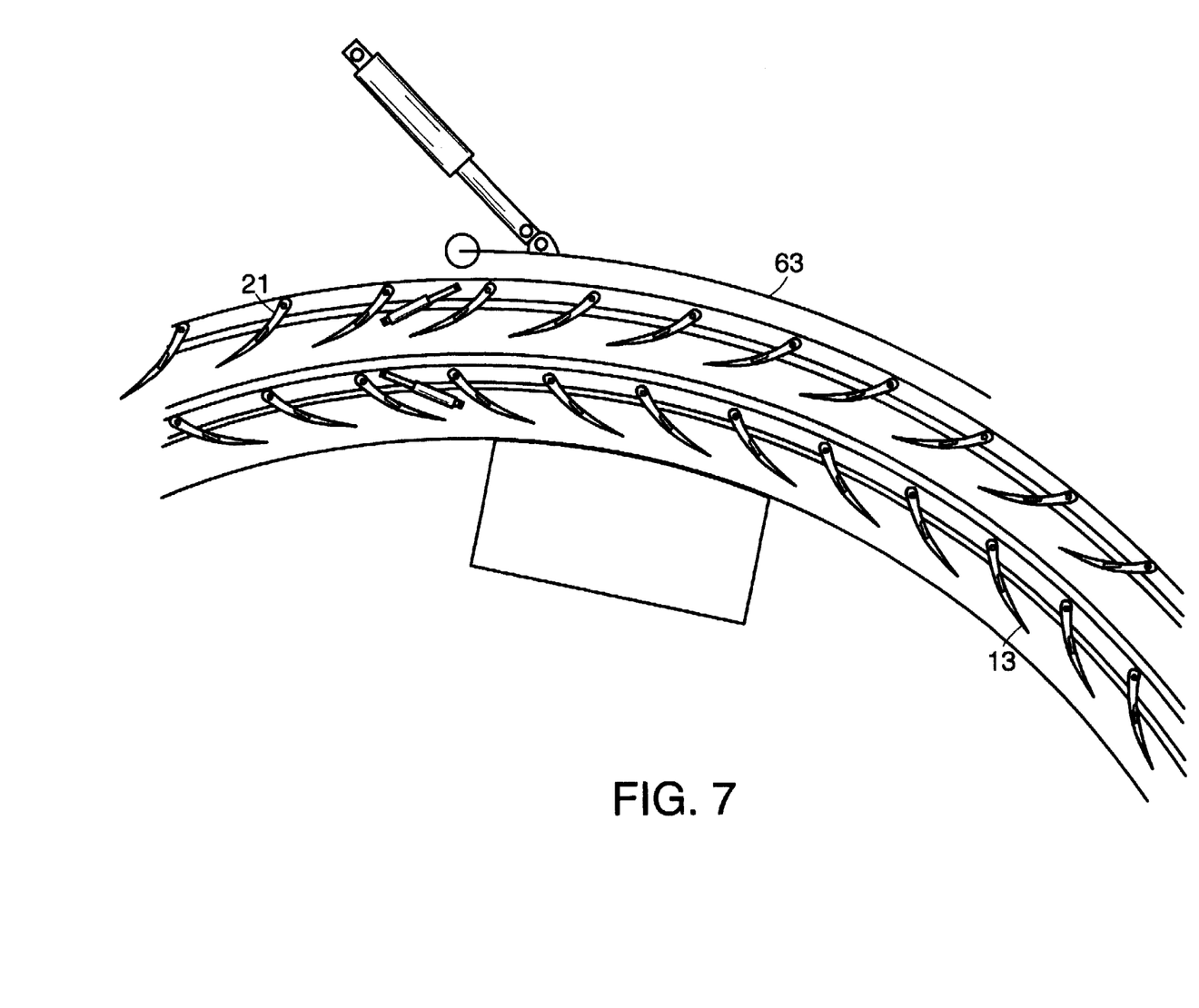
FIG. 7 shows alternate positions for the adjustable stator and turbine mechanisms.

FIG. 7 shows the same portion of the turbine blades 13, stator blades 21 and doors 63 when their actuators have been activated and the flow of air diminished. The lifting forces provided by that particular turbine airfoil lifting device will be diminished. By selecting one or a group of turbine airfoil lifting devices out of all the devices contained in an aircraft for such lowering of lift, control of the aircraft may be achieved. Roll control, utilized in banking the aircraft may be obtained by diminishing lift from either port or starboard side turbine airfoil lifting devices as desired. Pitch control may be obtained by diminishing lift from either fore or aft turbine airfoil lifting devices as desired.

I claim:

1. A turbine airfoil lifting device consisting of airfoils that rotate in ambient air to provide lift, a cylindrical structure attached to the airfoils containing a turbine, a supply of energized air distributed to the turbine causing it and the attached airfoils to rotate, confining surfaces that contains both the energized air to be distributed and the turbine airfoil unit, and a bearing mechanism between the rotating turbine airfoil cylinder and the containing structure.

2. An aircraft wherein the lift required for vertical flight is obtained by the utilization of one or multiple turbine airfoil lifting devices described in claim 1.

3. An aircraft described in claim 2 consisting of one or more engines providing energized air, a cowling for directing the energized air into a disk-like structure and plenum chamber which distribute the energized air to each turbine of the turbine airfoil lifting devices, and one or more turbine airfoil lifting devices providing lift.

4. An aircraft described in claim 2 containing controllable apertures for the discharge of energized air from the disk providing yaw, longitudinal, and lateral control to the aircraft.

5. An aircraft described in claim 2 containing adjustable means of restricting air flow to the turbine blades of each of the turbine airfoil lifting devices to provide pitch, roll, and vertical control to the aircraft.

* * * * *